Figure 3:
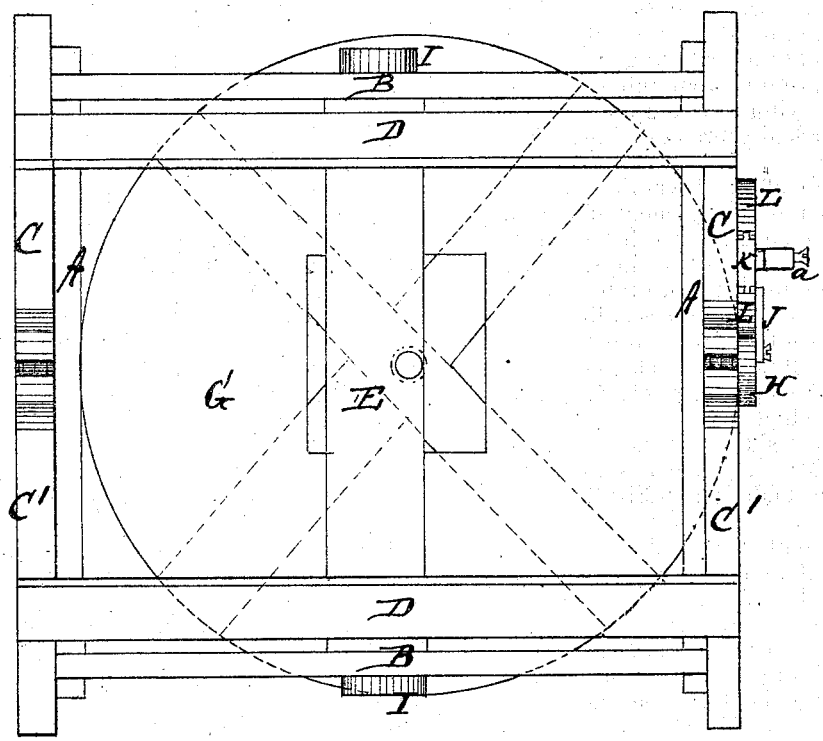

2 Sheets--Sheet 1.
MYRON G. WOOD.
Improvement in Animal Power.
No. 120,357.
Patented Oct. 24, 1871.
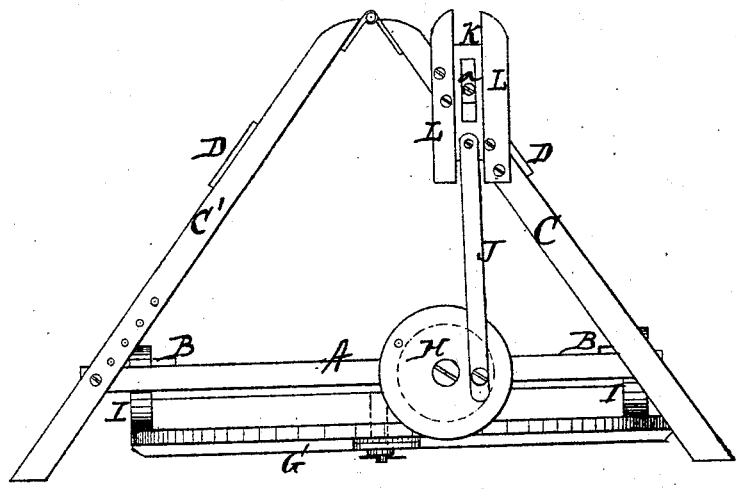
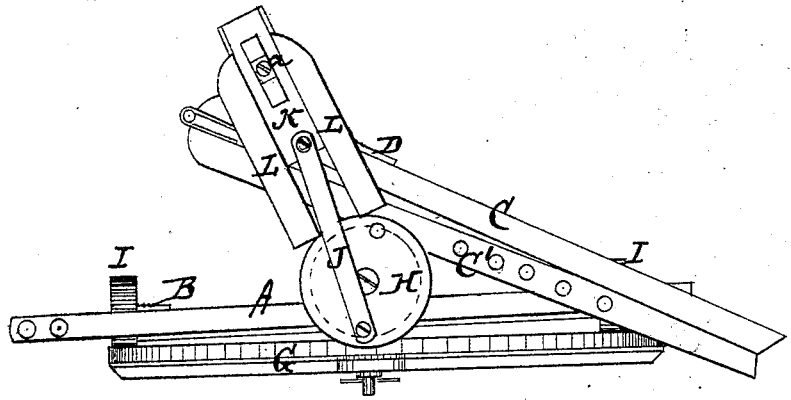
Witnesses:
Franck L. Durand.
C. L. Evert.
Inventor
Myron G. Wood.
per Franck & Mason
Attorneys.

2 Sheets--Sheet 2.

MYRON G. WOOD.
Improvement in Animal Power.

No. 120,357. Patented Oct. 24, 1871.

Witnesses:
Franck L. Durand
C. L. Cevert

Inventor
Myron G. Wood
per Khander Thialon
Attorneys.

UNITED STATES PATENT OFFICE.

MYRON G. WOOD, OF CHURCH CORNERS, MICHIGAN.

IMPROVEMENT IN ANIMAL-POWERS.

Specification forming part of Letters Patent No. 120,357, dated October 24, 1871.

*To all whom it may concern:*

Be it known that I, MYRON G. WOOD, of Church Corners, in the county of Hillsdale and in the State of Michigan, have invented certain new and useful Improvements in Churn-Power to be Operated by Dogs or Goats; and do hereby declare that the following is a full, clear, and exact description thereof, reference being had to the accompanying drawing and to the letters of reference marked thereon making a part of this specification.

The nature of my invention consists in the construction and arrangement of a folding power for operating churns or other small machines, the power to be worked by dogs, sheep, or goats, as will be hereinafter more fully set forth.

In order to enable others skilled in the art to which my invention appertains to make and use the same, I will now proceed to describe its construction and operation, referring to the annexed drawing, in which—

Figure 1 is a side view, showing the power in working order. Fig. 2 is a similar view, showing the power folded; and Fig. 3 is a plan view of the machine.

A A represent two parallel beams connected, by means of two parallel cross-bars, B B, near their ends. The frame thus formed is suspended from legs C C and C' C'. The legs C C are pivoted one to each beam A at one end while the legs C' C' are adjusted at any height desired on the other ends of the beams. The legs C C are connected by a bar, D, and the legs C' C' are connected in a similar manner. The legs C C' on each side are hinged together so that they can be folded together, and the power put away when not in use. To the center of the cross-bars B B is secured a bar or board, E, under the center of which is pivoted a wheel or disk, G.

A dog, sheep, or goat being placed upon the disk G on one side of the bar E, the weight thereof causes the other side of the disk to bear against a wheel, H, pivoted on one of the beams A. Two other wheels, I I, are placed one on each end of the bar E to steady the disk. A pitman, J, connects the wheel H with a cross-head, K, moving in slides L attached to the leg C. On this cross-head is a wrist-pin, $a$, to which is attached the dasher-rod of a churn or other machine to be worked. The animal walking on the disk G causes the same to rotate, revolving the wheel H and giving to the cross-head the necessary reciprocating motion.

Having thus fully described my invention, what I claim as new, and desire to secure by Letters Patent, is—

The within-described folding power, consisting of the frame A B E, legs C C', disk G, wheels H I, pitman J, cross-head K, and slides L, all constructed and arranged to operate substantially as and for the purposes herein set forth.

In testimony that I claim the foregoing I have hereunto set my hand this 28th day of August, 1871.

MYRON G. WOOD.

Witnesses:
C. L. EVERT,
M. W. CHURCH. (67)